Feb. 9, 1932.   C. W. WYMAN   1,844,910
CONTROLLING APPARATUS
Filed Jan. 2, 1929
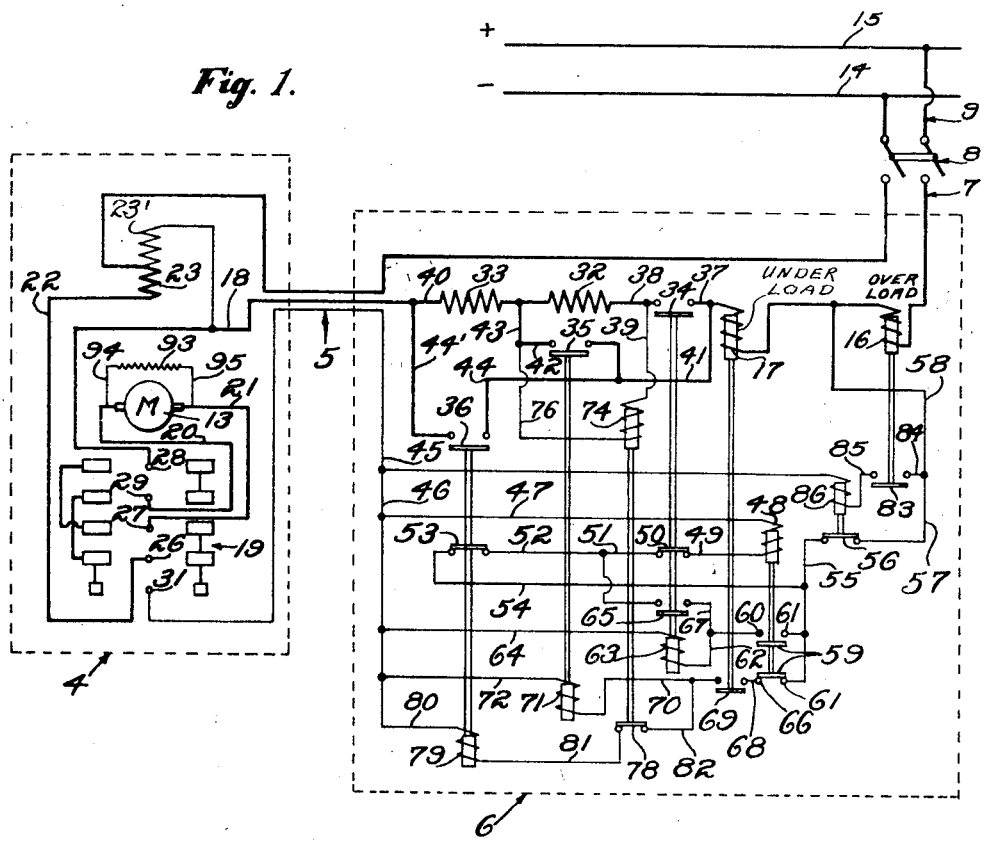
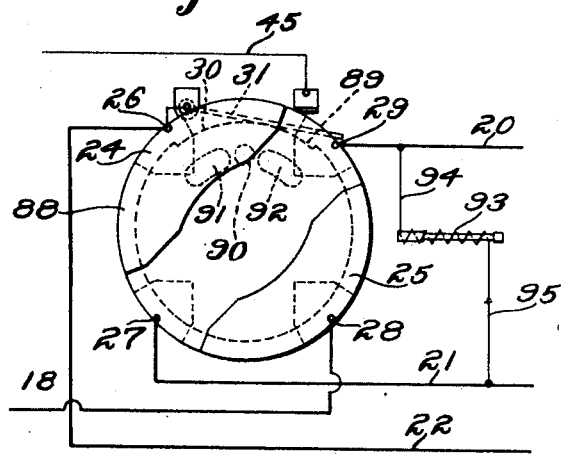
INVENTOR:
CHARLES W. WYMAN.
BY Louis A. Maxson
ATT'Y.

Patented Feb. 9, 1932

1,844,910

UNITED STATES PATENT OFFICE

CHARLES W. WYMAN, OF CLAREMONT, NEW HAMPSHIRE, ASSIGNOR TO SULLIVAN MACHINERY COMPANY, A CORPORATION OF MASSACHUSETTS

CONTROLLING APPARATUS

Application filed January 2, 1929. Serial No. 329,928.

My invention relates to controlling apparatus for electric motors.

An object of my invention is to provide an improved automatic controlling apparatus and particularly an improved automatic controlling apparatus located at a point remote from the motor under its control. In certain types of automatic control mechanism for motors operated under the control of a pilot circuit the final contactor is held closed to place the motor directly on the line by a coil energized from the pilot circuit continuously during normal running of the motor. An example of this type of controlling apparatus is disclosed in my copending application Serial No. 243,964, filed Dec. 31, 1927. In that case I am claiming an electric motor control system including a motor, main power lines leading thereto, an adjustable resistance, and apparatus for connecting the motor to the power lines through the resistance and for gradually cutting out the resistance as the motor comes up to speed, which apparatus comprises a plurality of switches, and electro-magnetic means for operating them in a predetermined sequence, a control circuit for supplying current to the electro-magnetic means, and mechanical means for automatically breaking the circuit through all of the electro-magnetic means except the one for operating the last switch when the last switch closes, the control circuit having a manually operable switch. My invention is particularly applicable in those automatic remote control systems of the above mentioned type which are energized by a control circuit requiring only one additional wire between the controlling apparatus at the remote point and the motor. Such an arrangement is especially desirable in mining machines where it is highly essential to make the machine itself as compact as possible. In this use the remote controlling apparatus may be located at any convenient point, as in the entry of a mine, and at the same time be under the complete control of the operator at the machine by means of a simple pilot switch. Another advantageous feature of the remote control as applied to mining machines lies in the fact that the only current which need be interrupted at the machine to secure complete control of the motor is a very small current through the pilot circuit. This practically eliminates all danger of sparks and arcing, which is highly essential when it is considered that the machine may be working in the presence of explosive gas. The units making up the major part of the controlling equipment may be located at a point where there is not apt to be present any inflammable gas or the same may be enclosed in a flame-proof casing. Such an arrangement thereby practically eliminates all danger from explosions due to electric sparks or arcing from the electrical apparatus of the mining machine. With this controlling apparatus as operated by the pilot circuit having only a single additional wire, it has been found that when the power circuit is interrupted temporarily for any reason whatever, as for example when the trolley clip is disconnected from the line, the armature of the motor will continue to revolve for a certain time and the coil of the last contactor is in a closed circuit across the armature terminals. This coil will therefore be energized by current from the revolving armature and the last contactor remains in closed position until the motor comes practically to a standstill. In case the power circuit is interrupted only for a few seconds or a fraction of a second, the motor may slow up materially or come practically to a standstill without a resetting of the controlling apparatus. It will thus be clear that when power again comes on the line, full line voltage may be applied to the armature while revolving only at a very slow rate. This may possibly result in a burning out of the armature. My invention may be equally applicable to other arrangements and types of controlling apparatus and also equally useful in connection with other types of machines than mining machines.

A major object of my invention is to provide means overcoming the above difficulty and which shall prevent the immediate application of full line voltage to the motor after the power has once been temporarily interrupted. A more specific object of my invention is to provide an improved controlling apparatus having a current failure relay connected in the pilot circuit so as to deenergize the coil for the last contactor and effect automatic resetting of the controlling apparatus. Other objects and advantages of the invention will appear during the course of the following specification and claims.

In the accompanying drawing I have shown for purposes of illustration one form which my invention may assume in practice.

In this drawing,—

Fig. 1 is a conventionalized wiring diagram of an improved controlling apparatus embodying my invention.

Fig. 2 is a detail diagrammatical view showing a reverse switch for the motor and interlocking mechanism therefor.

In the preferred embodiment of my invention I have employed an improved controlling apparatus of the same general character as that disclosed in my copending application referred to above, and I have combined therewith means for interrupting the pilot circuit through the holding coil for the last contactor in response to voltage change in the main line so as to prevent "sticking" of the last contactor when the power supply is temporarily interrupted and effect an automatic resetting of the controlling apparatus. In a preferred embodiment this means comprises a current failure relay connected in series with the power line leading to the motor and arranged to interrupt a pilot circuit for the holding coils of all the contactors except the initial contactor until the line voltage returns to normal. In its fundamental aspect the invention is of course not limited specifically to the controlling apparatus shown in the drawing and may be equally useful with other types of automatic controlling devices. Also the means for preventing application of full line voltage to the motor immediately after a temporary failure of the power supply may assume other forms than the current failure relay which I have provided in my preferred embodiment.

In Fig. 1 the portion of the mechanism surrounded by the broken lines and designated generally by the reference character 4, represents a mining machine working at the face. The apparatus on the machine is connected by a long flexible cable containing three wires and indicated at 5. The controlling apparatus, which preferably remains in the entry, is diagrammatically represented within the broken line enclosure 6. This controlling apparatus is connected by another cable 7 with the main line switch 8 which serves to connect the apparatus through suitable conductors 9 with the power line in the entry. Suitable grounding means may be and preferably is employed, but is not illustrated in this diagrammatic view. The controlling apparatus 6 as well as the switch 8 may be set up at any convenient point, even hundreds of feet away from the mining machine 4 if desired.

Power is supplied to the mining machine motor 13, which has series and shunt fields 23 and 23' respectively, from power lines 14 and 15, the circuit being completed from the positive wire 15 and line switch 8 through an overload relay coil 16, a coil 17 of a current failure relay and through the automatic resistance controlling apparatus to be hereinafter more fully described, to a line 18, a reverse switch generally designated 19, wire 20 through the armature of the motor, wire 21 and the reverse switch to wire 22, series field coils 23 and back to the negative line 14. The reverse switch 19 herein illustrated is shown and described in full in an application being filed by me of even date herewith and reference may be had to that application for a more detailed description of the reverse switch and its interlocking mechanism. That application is Serial No. 329,929 and in it I am claiming the reverse switch and the current flow establishing means controlled therewith and the automatic control whereby while reversing is prevented until the motor speed is much reduced, movement of the reverse switch to cause interruption of current supply is possible. For the purposes of the present application, it will be sufficient to say that the reverse switch which is shown in Fig. 1 other than as actually mechanically constructed to facilitate understanding of its circuit making functions, but whose general construction is shown in Fig. 2, includes a rotatable operating element which carries a plurality of segmental reverse switch contacts 24 and 25 and stationary contacts 26, 27, 28, and 29. The operating element of the reverse switch has cams at opposite sides of an indented portion 30 adapted to cooperate with a pilot switch 31 for automatically closing the pilot circuit upon movement of the reverse switch in either direction from a neutral position. This pilot switch is open when the reverse switch is in neutral position or when it is within a certain angle at either side of neutral position, since it engages the indented portion 30 of the operating element and is closed only after contact is made between the movable and stationary reverse switch contacts.

The units making up the automatic controlling apparatus located at the remote point will next be briefly described. A resistance unit herein comprising only two sections 32 and 33 is arranged to be connected into the motor circuit under the control of contactors 34, 35, 36 so as to connect the motor to the line at starting through all of the resistance and after a predetermined time to reduce the resistance and finally to connect the motor directly across the line. Upon closing of the initial contactor 34, the motor is connected to the power through all of the resistance by means of wire 37 leading from relay 17, contactor 34, wire 38, resistances 32, 33, and wires 40 and 18. Upon closing of the second contactor 35, current flows to the motor only though section 33 of the resistance from wire 37 to wire 41 and from the contactor 35 through wires 42, 43 and thence through resistance 33 to wires 40 and 18. Upon closing of the final contactor, the resistance is all cut out and the motor placed directly across the line by means of wires 41, 44 and 44'.

The pilot circuit for effecting control of the automatic controlling apparatus at the remote point will next be described. Upon closure of the pilot switch 31, a circuit is completed from the minus wire 14 through series field coils 23, wire 22, contact 26, switch 31, pilot wire 45, wires 46, 47, coil 48, wire 49, normally closed switch 50, wires 51, 52, normally closed switch 53, wires 54, 55, normally closed switch 56, wires 57, 58, and the overload relay coil 16 to the positive wire 15. This circuit energizes coil 48 and opens the accelerating relay 59, 61, 66, and simultaneously makes contact at 61, 59, 60 and completes a circuit from the positive side of the line 15 through overload relay coil 16, wires 58, 57, switch 56, wire 55 to contact 61 and from contact 60 to wire 62, coil 63, wires 64, 46, 45, and back to the negative side of the line through the pilot circuit as outlined above. This energizes coil 63, closing the first accelerating contactor 34 and connecting the motor to the line through the resistance. Upon closing of this contactor, switch 50 opens and switch 65 closes. As soon as contactor 34 closes solenoid 74 is energized opening relay switch 78. Switch 69 is also closed immediately. When the energizing circuit for accelerating relay coil 48 is broken at switch 50 the coil is deenergized. It will, however, due to the design and construction of this relay, take a certain amount of time for the current in coil 48 to die out therefore providing the desired time interval between closing of the first and second accelerating contactors. When coil 48 is completely deenergized, 59 will break contact at 60 and make contact at 66. When contact is broken at 60, the old circuit for coil 63 is broken, but a new circuit has been completed from the plus side through 55, wire 54, switch 53, wire 52 and switch 65 which is now closed, to wire 67, coil 63, 64 and 46 to the minus side of the line. When 59 makes contact at 66, a circuit is completed from the positive side through 55, 61, 66, wire 68, switch 69 of the current failure relay, wire 70, coil 71 which is the holding coil for the second accelerating relay, wire 72, and back to the minus side through 46 and the pilot wire 45. Simultaneously with the closing of the first accelerating contactor 34, the holding coil 74 of the last accelerating relay is energized with the result noted above, namely opening of the switch 78, by the voltage drop across the first section 32 of the resistance, the holding coil 74 being connected across said resistance by wires 39 and 76. Now when coil 71 is energized and the second contactor closes, the first section of resistance is short circuited and current in coil 74 dies out, allowing relay switch 78 to close. Closing of this relay effects energization of coil 79 of the last accelerating contactor since it is connected in parallel with coil 71 (which is energized as before described) by means of wire 80 on one side and wire 81, switch 78 and wire 82 on the other side. This closes contactor 36 and places the motor directly on the line and simultaneously opens switch 53 which breaks the circuit through coil 63 of the first contactor. Coils 71 and 79 are however kept energized by the pilot circuit traced above which includes switch 69 of the current failure relay.

In the event of an overload, coil 16 will cause closing of switch 83 and current will flow from the positive side through 15, 58, wire 84, switch 83, wire 85, coil 86 and to the minus side through the pilot wire 45. This energizes coil 86 and opens switch 56, thereby breaking the control circuit for all the accelerating contactors and shutting down the motor, at the same time resetting the controlling apparatus.

In operation the motor will be started by placing the reverse switch in the desired position and closing pilot switch 31. The motor is automatically connected across the line through a resistance and the resistance gradually cut out to place the motor directly on the line after it has had time to come up to speed. Now in the event of a break in the power circuit which may occur, for example, if the usual trolley clip is moved along and removed from the trolley wire either accidentally or purposely, the current failure relay will open the control circuit for the holding coils of the second and third contactors at 69, thereby preventing the last contactor being held in and holding the motor directly on the line. Without the current failure relay in the control circuit it will be observed that when the power circuit is broken temporarily for a few seconds or a fraction of a second, the motor armature will keep on revolving and generate a current in the circuit including wire 20, reverse switch contacts 29, 28, wire 18, wire 44', contactor 36, wires 44, 41, 58, 57, 56, 55, 61, 66, 68, 69, (which would merely be a permanent contact in the absence of the voltage failure relay) through 71 and 79 in parallel, to 46, 45, pilot switch 31 and reverse switch contacts 26, 27 to the other armature terminal through wire 21. In my improved controlling apparatus employing the current failure relay connected as illustrated and described, the control circuit through the final contactor coil is broken immediately when the power circuit is broken. The energizing circuit for the first contactor coil is, however, not interrupted, and provided the operator does not open the control switch at the machine the apparatus will automatically start up on return of the voltage to normal, connecting the motor first through the resistance and giving the same a chance to come up to speed before connecting it directly across the line. My improvement therefore provides adequate protection against burning out of the motor armature when the power supply circuit is temporarily broken without opening the pilot switch at the machine.

The reverse and pilot switch mechanism are shown in off position in Fig. 2. This mechanism will be described only briefly in this application and for a more detailed description reference may be made to my application of even date herewith referred to above. The reverse switch contacts 24 and 25 are loosely connected to a rotatable operating element 88 which in a preferred embodiment has gear teeth cut on its outer periphery to form a gear segment adapted to mesh with a gear on an operating shaft. A suitable cam shaped portion, which in the preferred embodiment takes the form of a series of teeth cut away to form the indented portion 30 of the operating element 88, is adapted to engage directly with the pilot switch 31 to close the same when the reverse switch is turned in either direction from the neutral position. When these cutaway teeth are in engagement with the pilot switch it is permitted to open, but when the operating element 88 is rotated to either side of a neutral position the full length teeth on the gear segment will engage the pilot switch and close the same. Closing of the pilot switch does not occur until after the movable reverse switch contacts have engaged the stationary contacts. An improved magnetic interlocking mechanism for the reverse switch and pilot switch operating element comprises a plunger 90 adapted to engage in either of a plurality of arcuate recesses 91 and 92 in the operating element when actuated to interlocking position by an electromagnet. The coil of this magnet which is indicated at 93 is connected directly across the armature terminals by wires 94, 95. In operation the coil 93 of the electromagnet will be energized by current generated in the armature after the main circuit is broken until the speed of the motor has died down and holds the plunger 90 in interlocking position in one of the recesses 91 or 92. The arcuate shape of these recesses permits sufficient movement of the reverse switch operating element 88 to effect closing of the pilot switch while preventing the circuit being broken at the reverse switch contacts until the coil 93 of the electromagnet is deenergized. This insures against an immediate reversal of current in the motor armature before the same has had time to stop rotating, and provides adequate protection against burning out of the armature from this cause.

As a result of my invention it will be evident that an improved automatic controlling apparatus for a reversible electric motor has been provided which shall give adequate protection to the motor windings under all circumstances; that these desirable features have been incorporated in a remote control system where the motor may be under the complete control of the operator at the machine while all of the units of the controlling apparatus are located at any convenient stationary point; and that these advantages have been obtained with the use of only a single wire in addition to the main power lines between the remote controlling apparatus and motor.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, an electric motor, a power line constituting the sole source of current supplied to the motor windings, and automatic controlling apparatus for said motor including a starting resistance, electromagnetically actuated contactor devices for connecting said motor with the line through said starting resistance and thereafter automatically cutting out the resistance, controlling means for said contactor devices including a pilot circuit and automatically controlled circuits for effecting serial operation of said contactor devices, certain of said automatically controlled circuits including a relay responsive to input current failure and automatically operative to effect reinsertion of the resistance in the motor circuit, but inoperative to maintain the motor disconnected from the line, on a substantial drop in line voltage.

2. In combination, an electric motor, a resistance, a power line, automatic controlling apparatus for connecting said motor to the line initially through the resistance and operative gradually to cut out said resistance and place the motor directly on the line, said automatic controlling apparatus having a single pilot control circuit, and means operative immediately upon failure of line current for automatically resetting said controlling apparatus so as, on return of the normal power supply, to connect the motor to the power line through the resistance and gradually cut out said resistance and place the motor directly on the line after a predetermined time interval.

3. In combination, a source of power, a motor, a resistance, primary circuit making and resistance short-circuiting contactors operating in sequence for connecting the motor to a source of power through said resistance and gradually cutting out said resistance, and means including a relay operative on failure of line current to effect substantially immediate opening of all closed resistance controlling contactors and on return of line current to effect connection of the motor through all said resistance to the power line through said primary circuit making contactor whereby said controlling apparatus must again function to cut out the resistance on return of the normal power supply.

4. In combination, an electric motor, a power line constituting the sole source of current supply to the motor windings, automatic controlling apparatus including an adjustable resistance and a plurality of resistance controlling contactors for controlling supply of power to the motor initially at reduced voltage and finally at full line voltage, a control circuit for controlling each of said contactors, and means including a current failure relay in the control circuit for one contactor operative, irrespective of regenerative action of the motor, in response to a substantial voltage drop in the power supply to interrupt the control circuit for the final contactor while establishing a circuit to effect initial contactor control to cause starting of the motor through said resistance.

5. In combination, a source of power, an electric motor, an adjustable resistance, a plurality of resistance controlling contactors, an initial contactor operating to connect the motor to the source of power through all of said resistance, and controlling means for said contactors including a pilot circuit for effecting closure of said initial contactor and means for closing the remaining contactors individually in predetermined sequence automatically and dependent on closing of the next preceding contactor, means for holding the final contactor closed during motor operation to place the motor directly on the line, and a current failure relay operative on interruption of the power supply to effect substantially immediate opening of the last contactor, said automatic controlling means operating thereupon to cause closing of the initial contactor on return of the normal power supply and thereafter to effect automatic operation of the remaining contactors before placing the motor directly on the line.

6. In combination, a source of power, an electric motor, an adjustable resistance, a plurality of contactors for connecting the motor to the source of power through said resistance and gradually cutting out said resistance to place the motor directly on the line after a predetermined time interval, electromagnetic means for closing said contactors in sequence when energized, and means operative on closing of each contactor for energizing the electromagnetic closing means for the next succeeding contactor after a definite time interval including a control circuit from which said electromagnetic means may be energized, means for closing a circuit through the electromagnetic holding means for the final contactor across the armature terminals, and a relay connected in said control circuit operative in response to a disconnection of the power supply, and immediately on occurrence of such disconnection, for deenergizing the electromagnetic holding means for the final contactor to cause resetting of said controlling apparatus whereby the motor is connected to the power through said resistance automatically when the power supply is again connected.

7. In combination, a motor, a power line constituting the sole source of current for the motor windings, a resistance, a contactor for connecting said motor with said current source through the resistance, a contactor for cutting out resistance, electromagnetic means for operating said contactors, and controlling circuits and devices for said electromagnetic means for automatically effecting operation of said contactors successively, the control circuit for said second mentioned contactor but not that for the first mentioned contactor having a relay switch therein responsive to input current failure, whereby upon substantial voltage drop in the power line the motor is substantially immediately disconnected from the line, said motor being thereafter, on a predetermined line voltage restoration, reconnected automatically first through the resistance and then through the second mentioned contactor under control of the controlling circuits and devices for said electromagnetic means.

8. In combination, an electric motor, a power supply line constituting the sole source of current supplied to the motor windings, a resistance, contactors for respectively connecting said motor to said supply line through said resistance and directly, and controlling means for said contactors including means operative to cause opening of the first contactor when the second is closed and means automatically operative immediately upon current failure in said power supply line to open the second contactor and to condition said controlling means to close the first contactor as the power supply returns to normal, thereby to effect supply of power to the motor at a voltage lower than line voltage when the power supply becomes normal.

In testimony whereof I affix my signature

CHARLES W. WYMAN.